May 3, 1966  C. B. DOWNING  3,248,980
DOUGHNUT STAMP CUTTING MACHINE
Filed June 5, 1964  10 Sheets-Sheet 1

Charlie B. Downing INVENTOR.

BY *Clarence A. O'Brien*
and *Harvey B. Jacobson*
Attorneys

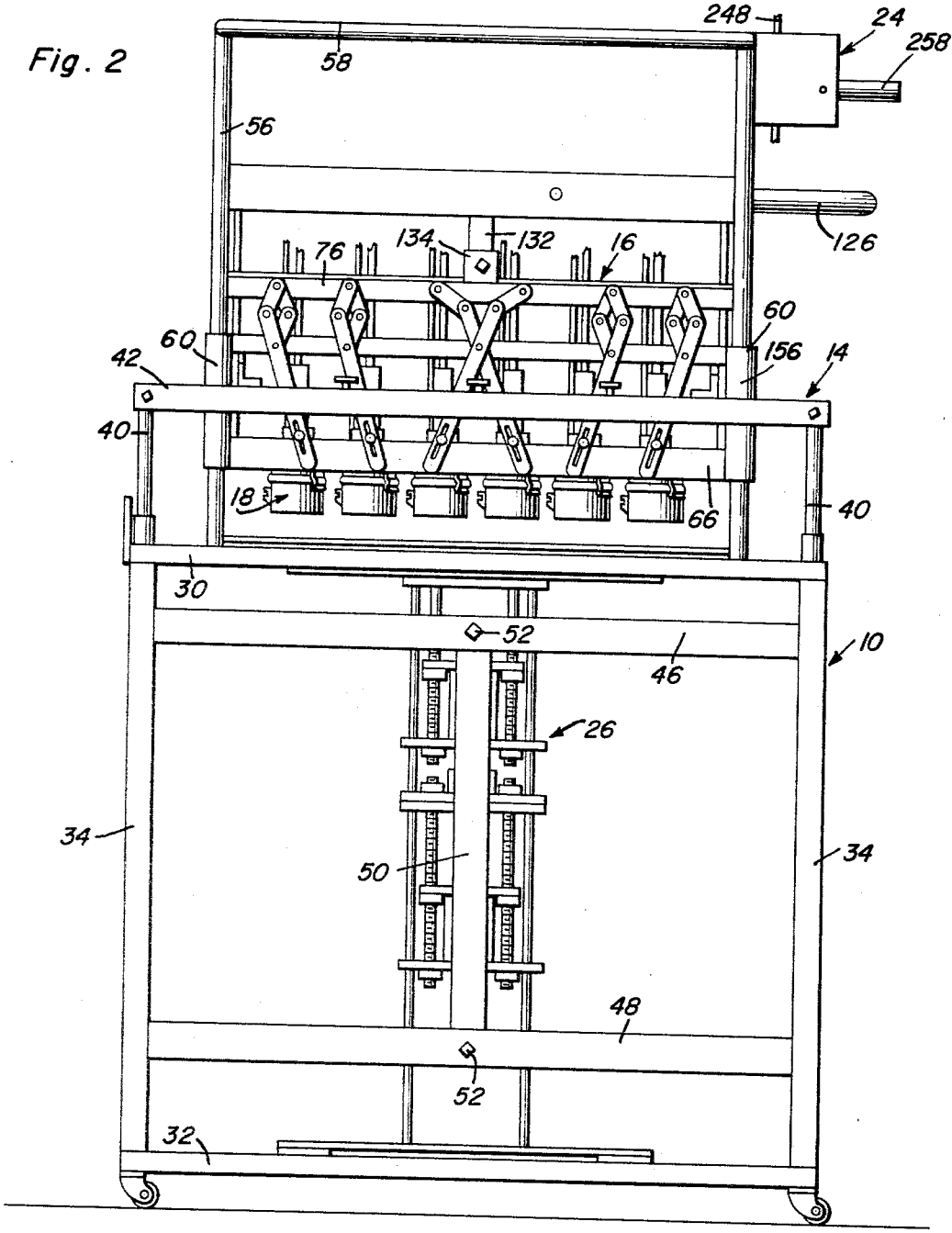

May 3, 1966 C. B. DOWNING 3,248,980
DOUGHNUT STAMP CUTTING MACHINE
Filed June 5, 1964 10 Sheets-Sheet 3

Charlie B. Downing
INVENTOR.

BY *Clarence A. O'Brien*
*and Harvey B. Jackson*
Attorneys

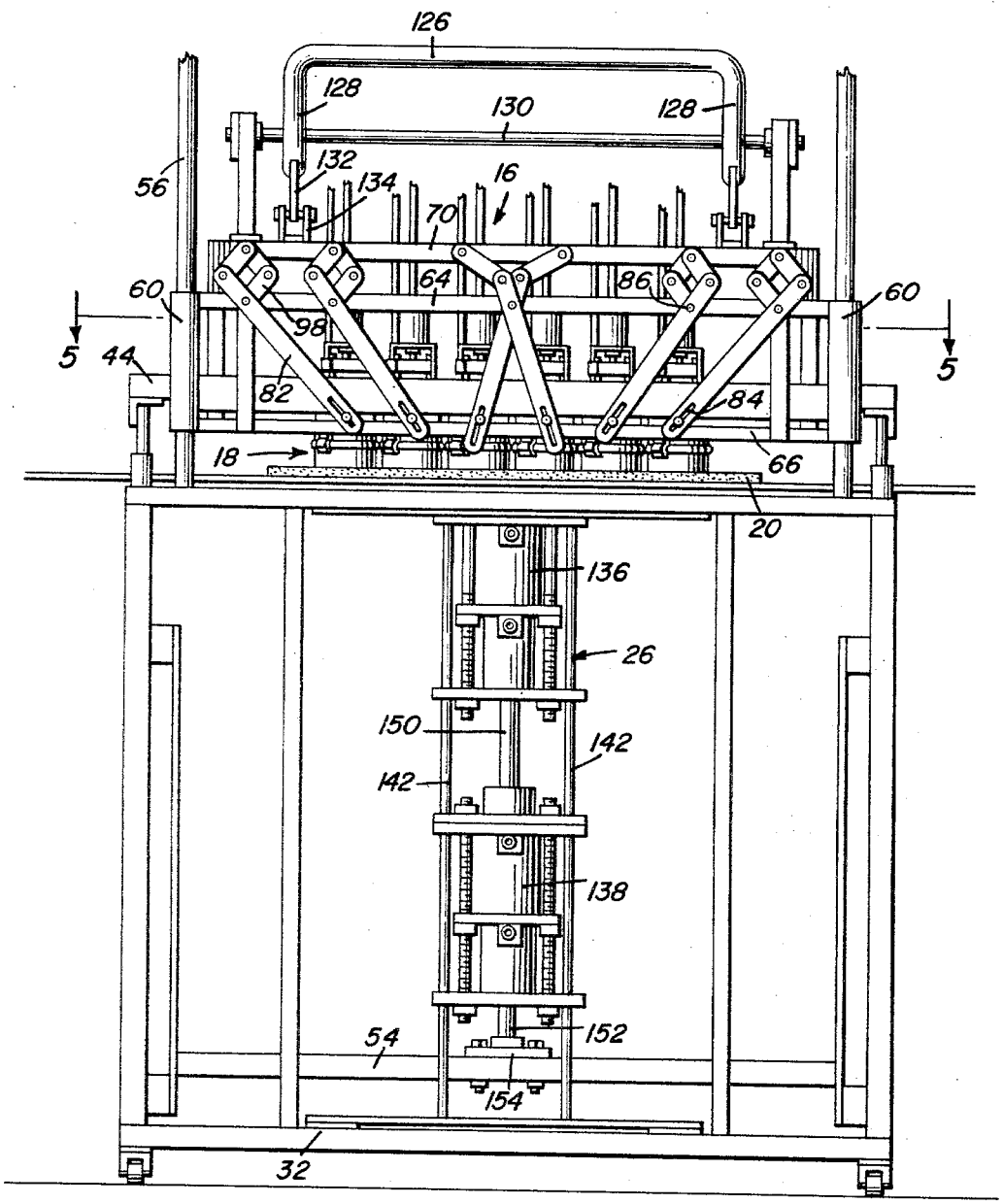

May 3, 1966   C. B. DOWNING   3,248,980
DOUGHNUT STAMP CUTTING MACHINE
Filed June 5, 1964   10 Sheets-Sheet 5

Charlie B. Downing
INVENTOR.

BY *Clarence A. O'Brien*
and *Harvey B. Jackson*
Attorneys

May 3, 1966 C. B. DOWNING 3,248,980
DOUGHNUT STAMP CUTTING MACHINE
Filed June 5, 1964 10 Sheets-Sheet 6

Charlie B. Downing
INVENTOR.

BY Clarence A. O'Brien
and Harvey B. Jacobson
Attorneys

Charlie B. Downing
INVENTOR.

May 3, 1966 C. B. DOWNING 3,248,980
DOUGHNUT STAMP CUTTING MACHINE
Filed June 5, 1964 10 Sheets-Sheet 8

Charlie B. Downing
INVENTOR.
BY Clarence A. O'Brien
and Harvey B. Jacobson
Attorneys May 3, 1966 C. B. DOWNING 3,248,980
DOUGHNUT STAMP CUTTING MACHINE
Filed June 5, 1964 10 Sheets-Sheet 9
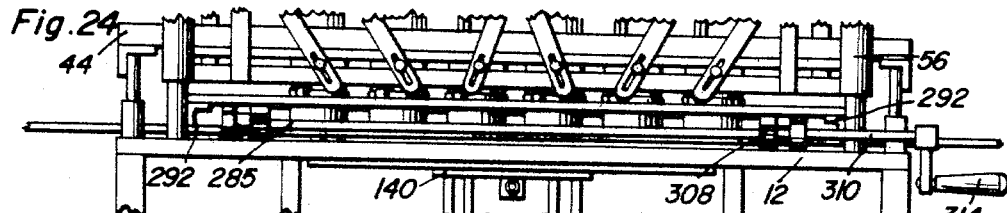
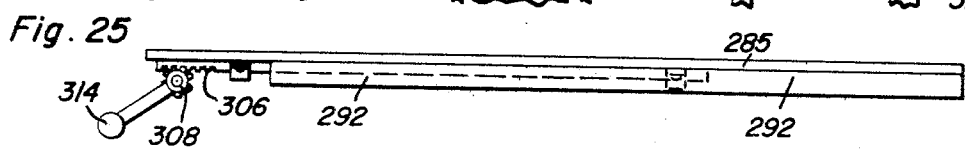
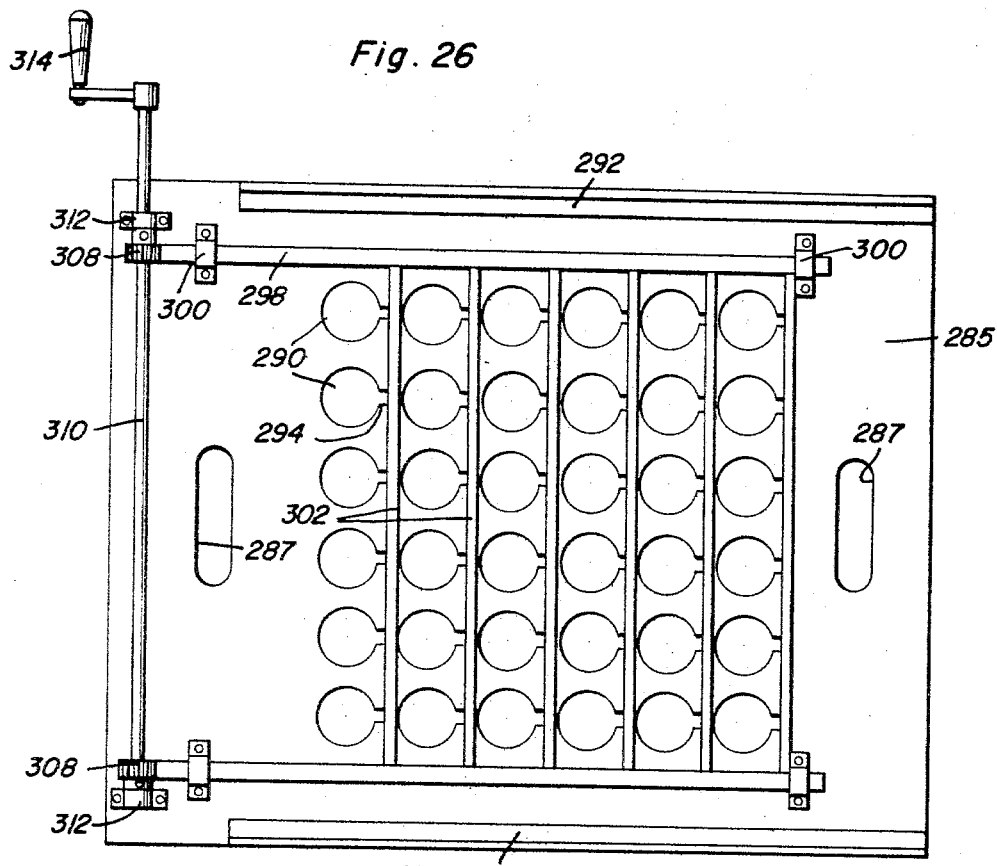
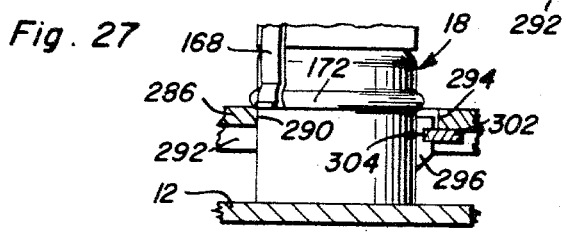
Charlie B. Downing
INVENTOR.
BY
Attorneys

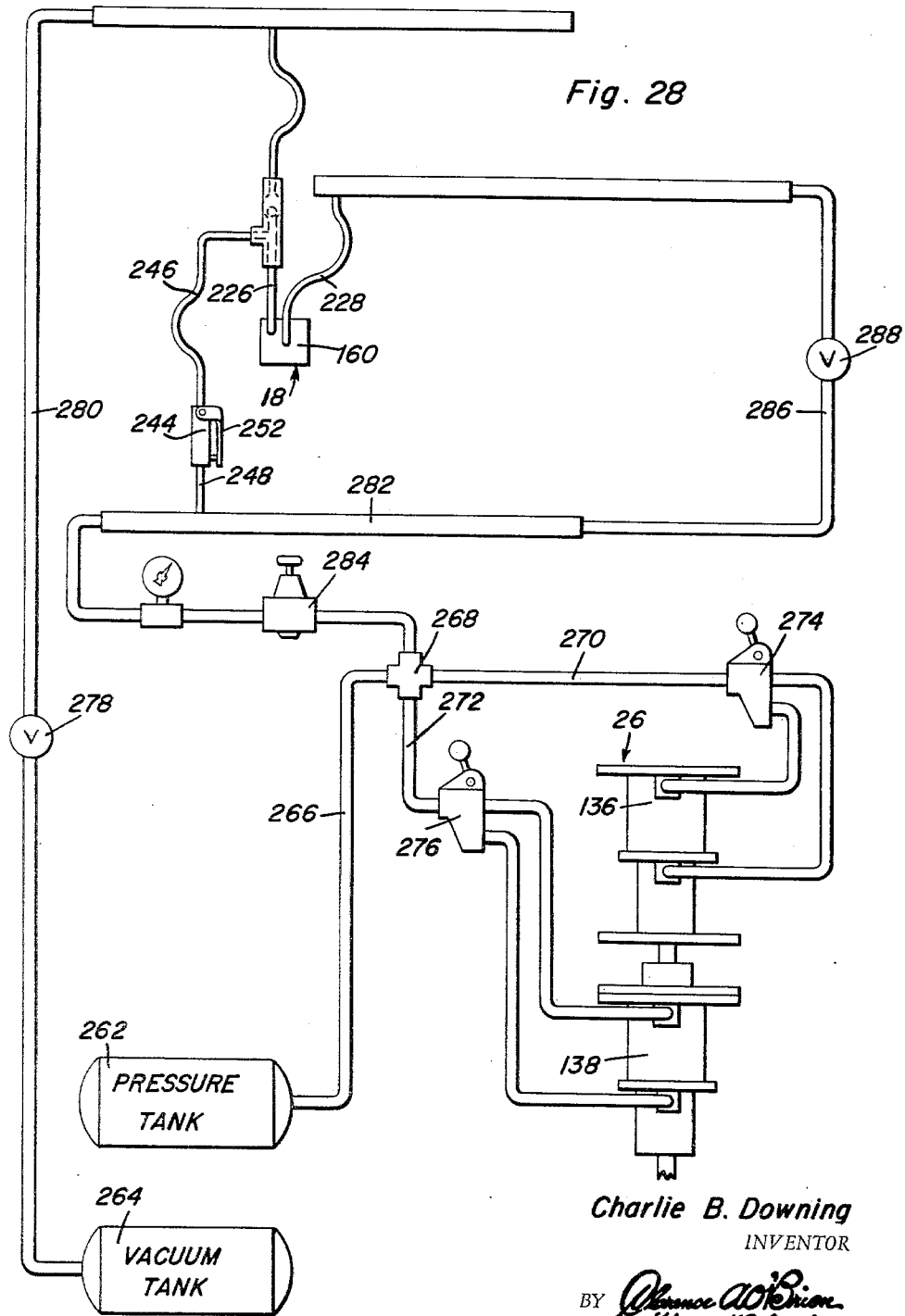

United States Patent Office 3,248,980
Patented May 3, 1966

3,248,980
DOUGHNUT STAMP CUTTING MACHINE
Charlie B. Downing, 941 N. Washington St.,
Janesville, Wis.
Filed June 5, 1964, Ser. No. 372,952
33 Claims. (Cl. 83—152)

This invention comprises a novel and useful doughnut stamp cutting machine, and more particularly pertains to a device for stamp cutting simultaneously a large number of closely spaced doughnuts from a sheet of dough, lifting the cut doughnuts and spacing them apart and thereafter depositing them, in a spread arrangement, upon a frying tray.

This application discloses improvements over and constitutes a continuation-in-part of my prior copending allowed application Serial No. 92,397, filed February 28, 1961, and carrying the same title and which is now abandoned.

This invention pertains more specifically to a machine provided with a plurality of cutters for cutting doughnuts and the like and which cutters are attached to and form a part of a cutter head assembly which is vertically movable by power means for cutting doughnuts, lifting the cut doughnuts, spreading them apart to a uniform spaced arrangement and then dropping them upon a baking tray therebeneath.

It is the primary object of the invention to provide a doughnut cutting machine which shall be automatic or semi-automatic in its operation, require a minimum of labor on the part of the attendant or operator and shall cut a large number of doughnuts in closely spaced relation from a sheet of dough, lift and transfer the doughnuts to a baking pan or frying tray and deposit them thereon in increased spaced relation.

A further object of the invention is to provide a device in accordance with the preceding objects having a compact arrangement of its components and yet which will be convenient and facilitate the movement of dough trays and baking screens or trays into or out of the apparatus.

A further object of the invention is to provide an apparatus in accordance with the foregoing objects having an improved operating means effecting the doughnut cutting stroke of the cutter assembly and effecting a clean severing of the sheet of dough to form the individual doughnuts with certainty and precision by a two-step and hammer action and with a minimum requirement for power and load upon the apparatus.

A still further object of the invention is to provide an apparatus in accordance with the immediately preceding object having a novel and advantageous cooperative relationship between the lifting assembly and the frame of the cutter head assembly to enable the former to selectively lift the cutter head assembly, lower it to a sheet of dough and then impart a sudden hammer blow to the cutter head assembly and effect thereby a complete, quick and clean severing of the dough by the individual cutters.

Another important object of the invention is to provide a device in accordance with the preceding objects which shall have a cutter head assembly, a lift means to raise and lower the cutter head assembly and means for guidingly mounting the latter for vertical movement controlled by the lift means and for individual vertical movement relative to the latter.

Another object of the invention is to provide an automatic doughnut cutting machine with an improved cutter head assembly wherein each of a plurality of individual cutters are mounted upon a pair of horizontally but perpendicularly disposed support and guide rods for sliding movement upon each of the rods.

A further important object of the invention is to provide a cutter head assembly for a doughnut machine having improved means for compactly and conveniently mounting as a unitary assembly a plurality of cutter heads for joint vertical movement to a raised inoperative position, a first lowered position in contact with a sheet of dough and a final lowered position in which the sheet is severed by the cutters to form individual doughnuts.

Still another object of the invention is to provide in a doughnut cutting machine an improved cutter structure which will simultaneously cut a sheet of dough to provide the inner and outer peripheries of a doughnut and which shall employ suction means to retain the segments of the dough thus cut in the cutter and having improved means for ejecting the doughnut upon a baking screen and independent means for thereafter ejecting the doughnut center from the cutter.

A further and more specific object of the invention is to provide a cutter having an improved fluid conduit system connected therewith for selectively applying suction to a doughnut containing portion and a doughnut center portion of the cutter, for retaining the suction upon the center portion when doughnut ejecting means within the cutter is brought into operation for ejecting the doughnut therefrom, together with means for thereafter venting the suction from the doughnut center retaining means and applying pressure to the suction conduits to eject the centers from the cutters.

Yet another object of the invention is to provide in a doughnut cutting machine a cutter head assembly having improved means for simultaneously removing all of the cutters from the cutter head assembly in order to interchange them with a different set of cutters and this interchanging operation being effected by a power means.

A still further object of the invention is to provide in an automatic doughnut cutting machine a cutter head assembly having means for varying the spacing from a minimum to a maximum of a plurality of cutter heads whereby to most economically cut doughnuts from a sheet of dough and for then spacing the cut doughnuts from each other to effect the most efficient frying of the doughnuts and wherein the spacing mechanism is operated manually in a simple manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view taken from the left side of FIGURE 1;

FIGURE 4 is a front elevational view but showing the cutters in their closely spaced position and in the lowered cutting position for cutting doughnuts from a sheet of dough and also with parts of the pneumatic system removed;

FIGURE 24 is a front elevational view of a portion of the apparatus and showing a cutter head holding board in place and which is used for changing a set of cutters;

FIGURE 25 is a side elevational view taken from the right side of FIGURE 24;

FIGURE 26 is a bottom plan view of the cutter board and showing the slots for receiving and orienting the cutters when they are to be removed or installed as a group in the machine;

FIGURE 27 is a detail view in vertical section and showing the position of a cutter in the cutter holder board, the cutter being shown in elevation therein; and FIGURE 28 is a diagrammatic flow sheet of the pneumatic system of the apparatus.

Figures 1, 8:
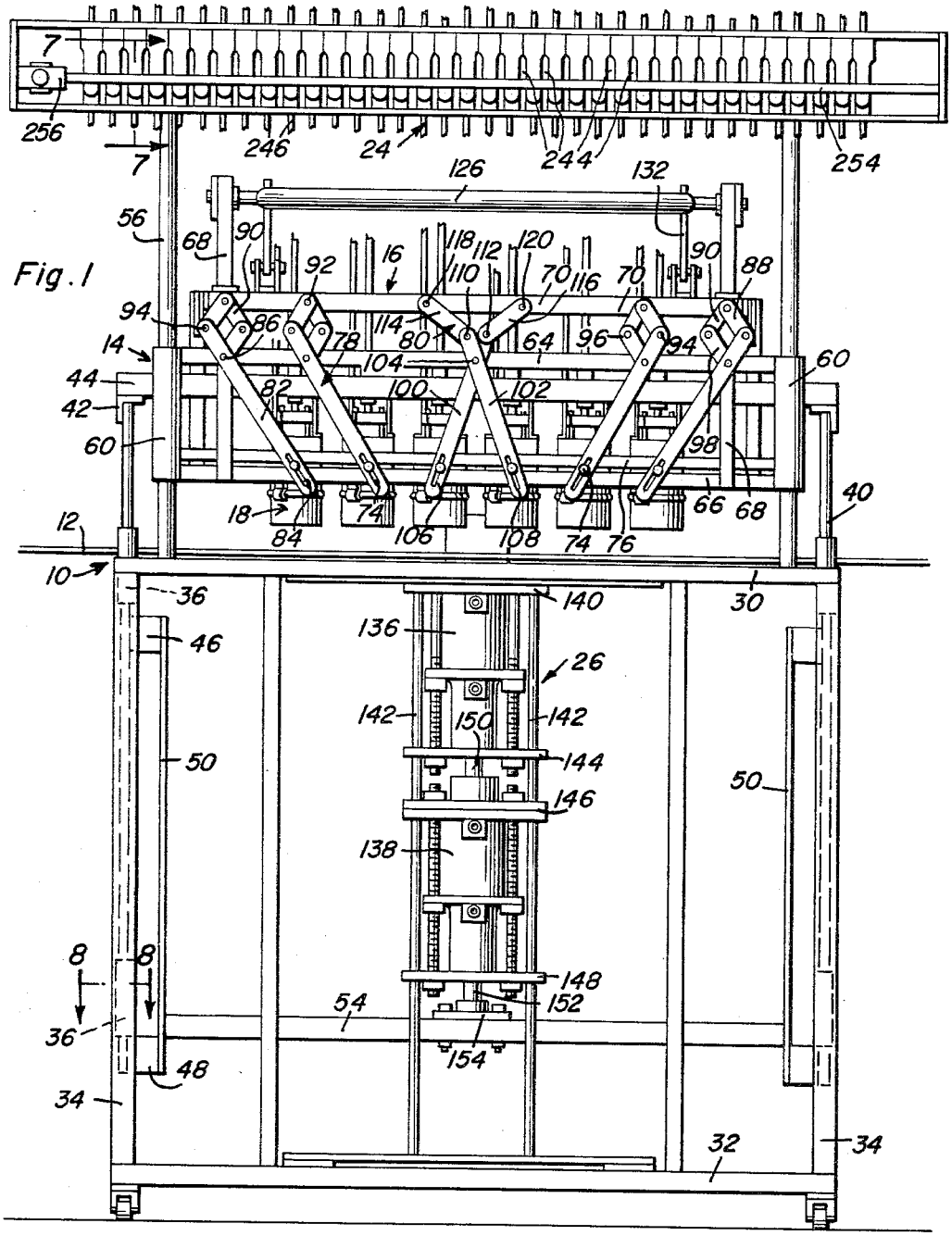
FIGURE 1 is a front elevational view showing the cutters extended and in the raised position and with parts of the pneumatic system removed.
FIGURE 8 is a detail view in horizontal section taken substantially upon the plane indicated by the section line 8—8 of FIGURE 1 and upon an enlarged scale and showing a corner support post of the base of the machine and a guide bushing thereon for the lifting rods of the elevating or lift mechanism of the apparatus.

The doughnut cutting machine in accordance with this invention in the embodiment chosen for illustration in the accompanying drawings, comprises an open, table-type base 10 having a work platform or shelf 12 thereon together with a carriage 14 mounted upon the base and movable vertically above the top of the base and the work platform. The carriage itself controls the lifting and lowering of the cutter head assembly 16, which latter includes a plurality of doughnut cutters 18 projecting downwardly therefrom for engagement with a sheet of dough 20 which may be supported in a baking tray, pan or frying tray 22. Alternatively, the sheet of dough 20 may rest directly upon the work platform or shelf 12 and it will be appreciated that the latter may comprise a conveying means such as a belt conveyor, not shown, and may be utilized to transport the dough beneath the cutters and after the cutting operation and removal of the doughnuts therefrom may then remove the used sheet and subsequently replace it with a fresh sheet.

The apparatus further includes the valve assembly indicated generally by the numeral 24 for venting the suction lines of each of the cutters 18 for thereby releasing dough held by the cutters in a manner to be subsequently set forth. For convenience of illustration, the valve assembly 24 is shown as being mounted at the top of the machine, although it may be mounted at other locations thereon as may be found to be expedient.

The apparatus further includes elevating means indicated generally by the numeral 26 and which is power operated and is effective to selectively raise the cutter head assembly to its uppermost position, to lower the cutter head to a first stage where it will engage the surface of the dough or will place the cutters upon a cutter holder board 28 when it is desired to remove one or more or the entire set of cutters and replace them with a new set as set forth hereinafter.

The base 10 may be of any suitable character and is illustrated as consisting of an open framework or support structure having a top wall 30 and a bottom wall 32 which rigidly is connected together by vertically extending columns, standards or supports 34, one being shown at each corner of the top and bottom walls. Preferably as shown in FIGURE 8 the standards 34 comprise angle members.

Each of the standards 34 has a plurality of vertically spaced guide bushings 36, shown in dotted lines in FIGURE 1, and which are secured to the inner surfaces of the angle member standards 34 as by welding 38. The guide bushings are appropriately vertically spaced and serve to guidingly and slidingly support the carriage 14 as set forth hereinafter.

Attention is directed next to the carriage assembly 14 in its entirety. This assembly comprises a lower slide and guide construction surmounted by a supporting table-like platform. The carriage slide and guide construction consists of four vertically extending support rods or posts 40, each slidable in a pair of the vertically spaced guide bushings 36 of the standards 34. At their upper ends, the rods or posts 40 are joined in pairs by a pair of horizontally extending parallel angle members 42 to which the posts are rigidly connected, and which pair of angle members in turn have at their opposite ends and secured upon their top surfaces a pair of parallel cross members 44. This provides a rectangular frame which is supported at its four corners for vertical movement by the support posts or rods 40. Also secured to the same pairs of rods as their angle members 42 are attached are upper and lower horizontal cross members 46 and 48 which have their mid-portions reinforced by a vertically extending brace member 50 secured as by fasteners 52. There are thus provided as will be apparent from FIGURE 1 a pair of generally rectangular slides directly attached to pairs of the support posts 40 and vertically movable therewith. Also extending between and fixedly secured to the lower portion of the vertical brace members 50 is a cross member 54 to which the operating end of the lift means 26 is secured. In this manner, the lift means imparts vertical travel to the slide and guide frame and thus to the upper carriage assembly portion in a manner to be subsequently set forth.

As shown clearly in FIGURES 1, 2 and 4 there is fixedly secured to and rising above the upper surface of the top wall 30 a plurality of vertically extending guide roads 56 and which as shown in FIGURE 2 are joined and rigidified by cross members 58 at their upper ends, the cutter head assembly 16 being guidingly and slidingly mounted upon these rods 56 for vertical travel thereon, while the rods may also carry at their upper end the valve assembly 24.

The carriage assembly 14 includes at each corner a sleeve or guide bushing 60 which is slidably guided upon a guide rod 56 for vertical movement thereon. Extending between the bushings 60 are upper and lower horizontal transverse members 64 and 66. Vertical members 68 are connected to and rigidify the upper and lower transverse members 64 and 66 and project above the former and are connected by a top transverse member 70. From a consideration of FIGURES 1 and 2 it will be observed that the upper, lower and top members 64, 66 and 70 are disposed in rectangular frames.

Figure 3:
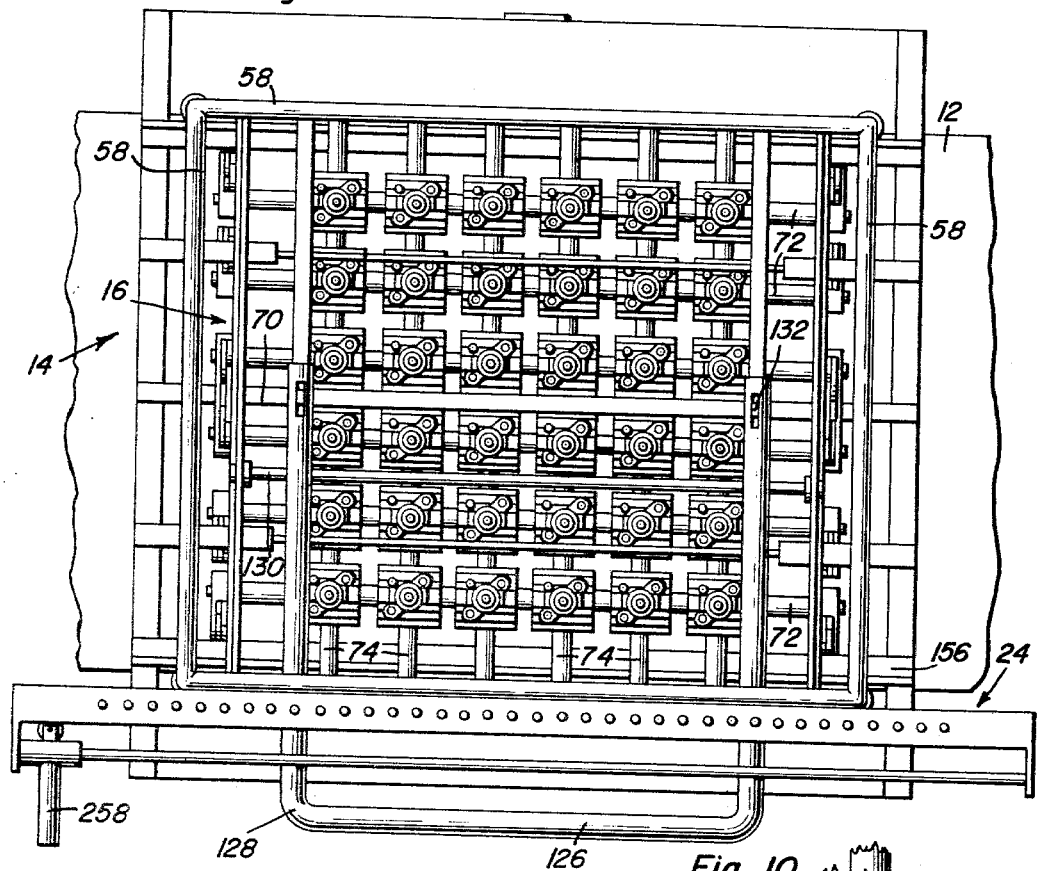
FIGURE 3 is a top plan view corresponding to the position of FIGURE 1.
Figure 5:
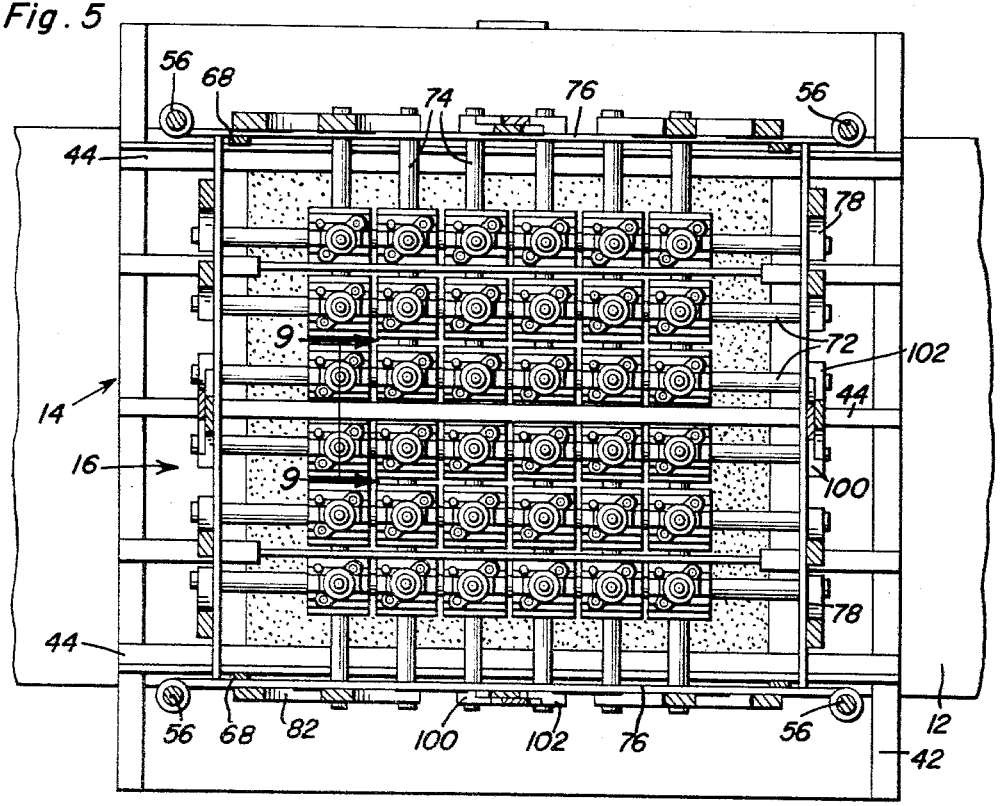
FIGURE 5 is a horizontal sectional view taken substantially upon the plane indicated by the section line 5—5 of FIGURE 4.
Figure 6:
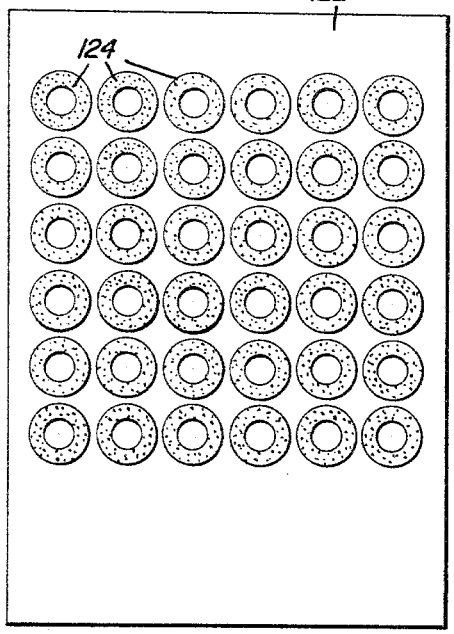
FIGURE 6 is a top plan view of the baking or cooking sheet showing the cut doughnuts or the finished product spaced and properly positioned thereon after operation of this apparatus.
Figure 7:
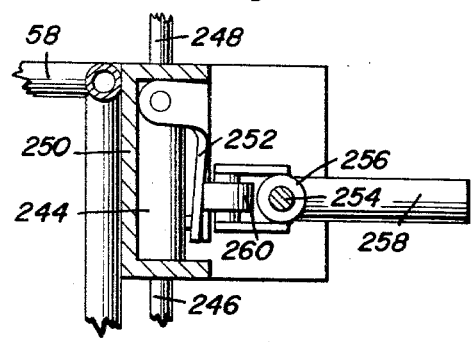
FIGURE 7 is a vertical transverse sectional detail view taken upon an enlarged scale substantially upon the plane indicated by the section line 7—7 of FIGURE 1 and showing the manual operating means for the center ejecting valve for ejecting the doughnut centers from the cutters.

As will be apparent from FIGURES 3, 5 and 6, the machine is adapted to simultaneously cut and handle 36 doughnuts being disposed in six rows of six cutters each. In order to support these cutters there are provided twelve support rods disposed in two vertically spaced horizontal sets of six parallel support rods each. Thus, the numeral 72 designates each rod of the upper set and the number 74 each rod of the lower set, it being noted that these rods are disposed perpendicularly with respect to each other. The relative disposition of the rods is shown more clearly in FIGURE 9 with regard to their association with the cutters 18. These rods are journaled in the corresponding horizontally extending transverse frame members of the cutter head assembly frame 16. For this purpose, as shown in FIGURES 1 and 2, each of the lower frame members 66 has provided in closely spaced relation thereabove the corresponding frame member 76 to provide a narrow slot therebetween in which the ends of the rods 72 and 74 are slidably received. The rods are thus horizontally shiftable laterally toward and from each other to vary the spacing therebetween for a purpose to be subsequently apparent and in order to control this slidable movement and resultant spacing of the rods there are provided a series of spacer linkages each indicated generally by the numerals 78 and 80. From FIGURE 1 it will be observed that the linkages on the front and back of the machine consist of four of the linkages 78 and one of the linkages 80, while as shown in FIGURE 2 the linkages on the sides of the machine are similar.

Considering first the linkages 78, it will be observed that each consists of a relatively long lever 82 having a slot 84 at its lower end which receives one of the rods 74 therein. Adjacent its upper end the link 82 is pivoted as at 86 to the upper transverse member 64 for relative pivoting movement thereon. A pair of upper toggle links 88 and 90 are pivoted at 92 to the top transverse member 70, and at their lower ends are pivoted as at 94 and 96 to the upper ends of the long levers 82 and to the upper end of a short connecting link 98 whose lower end is secured by the pivot 86 to the upper transverse member 64 and to the long lever 82.

A similar arrangement is provided for the linkage 80, which latter consists of a pair of long links 100 and 102 pivotally connected to each other and to the upper transverse member 64 as by a pivot pin 104, and having their slotted lower ends 106 and 108 respectively receiving therein the ends of the cutter support rod 74. The upper ends of the two long levers are pivoted as at 110 and 112 to the ends of links 114 and 116 whose uppermost extremities are pivoted at 118 and 120 to the top transverse member 70.

The same arrangement is provided for the linkages on the sides of the machine as shown in FIGURE 2 which are connected to the upper support rods 72. A slightly different relative location of the pivotal connections of the two assemblies 78 and 80, is necessary in view of the difference in the vertical spacing of the rods 72 and 74. It will be appreciated that in order to equally space the cutters in both their contracted and expanded positions that the outer rods of each set 72, 74 must move a greater distance than do the two innermost rods. This can be readily effected by appropriately varying the vertical spacing of the pivots 86 and 104 upon the linkage levers and upon the transverse frame members. The arrangement is such that when the top transverse members 70 are raised or lowered relative to the rest of the cutter head assembly and in particular with respect to the upper and lower transverse members 64 and 66, the linkages will be actuated to cause movement of the support rods 72 and 74 toward and from each other simultaneously.

Consequently, the cutters carried by the support rods may be selectively moved from the closely spaced relationship shown in FIGURE 5, in which they are adapted to cut the doughnut blanks from the sheet of dough with a minimum wastage of dough on the sheet, to an expanded or spread position as shown in FIGURE 3 and in which they are adapted to deposite the cut doughnut blanks as shown in FIGURE 6 and deposit them upon the doughnut making or frying tray or pan 122. The doughnut blanks themselves are shown at 124 in FIGURE 6 and during the process of their cutting from the sheet of dough appear in FIGURES 15, 17, 18 and 19.

Manually operated means are provided for operating the linkages 78 and 80 and thereby effect the expanding and contracting movement of the support rods and the doughnut cutters mounted thereon. This manual operating means comprises a U-shaped handle 126 whose arms 128 are rockably supported by a shaft 130 carried by the vertical members 68. The ends of the arms 128 are provided with pivoted links 132 which are pivotally connected to lugs 134 carried by the top transverse bar 70 of the cutter head assembly. Consequently, upon rock of the handle 126 about its shaft 130, the top transverse bar 70 will be raised or lowered and through the associated linkages 78 and 80 will in turn effect the spreading or the closing of the cutters 18 with respect to each other. It will be observed that this movement is independent of the vertical travel of the carriage assembly 14 upon the guide and support post 56.

It is contemplated that there will be sufficient resistance to shifting of the doughnut cutters 18 upon their support rods 72 and 74 to cause the cutters to remain in their adjusted positions thereon. However, if desired, any suitable form of locking means may be provided for retaining the cutters in their adjusted positions until the manually operated handle 126 is again actuated.

As so far described, it is to be understood that the carriage assembly 14 carrying the cutter head assembly 16 will be moved by gravity to its lower position upon the guide and support rods 56. A spring means of any suitable construction may be provided, if desired, to insure such downward movement. However, during the operation of the cutter head assembly for cutting doughnuts from a sheet of dough, the elevating mechanism 26 cooperates with the carriage assembly to effect positive upward and downward travel in conjunction with the lifting and lowering of the carriage 14.

Considering now in greater detail the elevating means 26, attention is directed primarily to FIGURES 1, 2 and 4. In a convenient mechanism for this purpose, the elevating means consists of a pair of associated fluid pressure operated cylinders, including an upper cylinder 136 and a lower cylinder 138. The upper cylinder has a mounting flange 140 by which it is secured to the underside of the top wall 30 for rigid mounting thereon. A set of vertically extending guide rods 142, fixedly secured at their upper and lower ends to the top wall 30 and the bottom wall 32, extends through the mounting flange 140, through an end plate 144 on the upper cylinder 136, through mounting plates 146 on the lower cylinder 138 and through an end plate 148 on the latter. As will be observed, the piston rod 150 of the upper cylinder supports the lower cylinder 138 whose piston rod 152 in turn is secured as by a mounting flange 154 to the cross member of the elevating means to effect vertical travel of the latter.

By a means to be subsequently set forth, fluid pressure is selectively applied to the upper and lower cylinders 136 and 138 to effect expansion and contraction thereof and thus to impart a vertical travel to the elevating means, the carriage and the cutter head assembly carried thereby. The upper cylinder operates to lift the carriage and the cutter head assembly to its uppermost position and from thence to a lower position where the cutter will be in contact with a surface of a sheet of dough. The lower cylinder serves solely for the purpose of imparting a sudden hammer-like blow to the elevating means and thus to the cutter head assembly for driving the cutters through the sheet of dough and severing the doughnut blanks cleanly therefrom after the cutters have been placed upon the top of the sheet of dough by operation of the upper cylinder 136.

Figure 9:
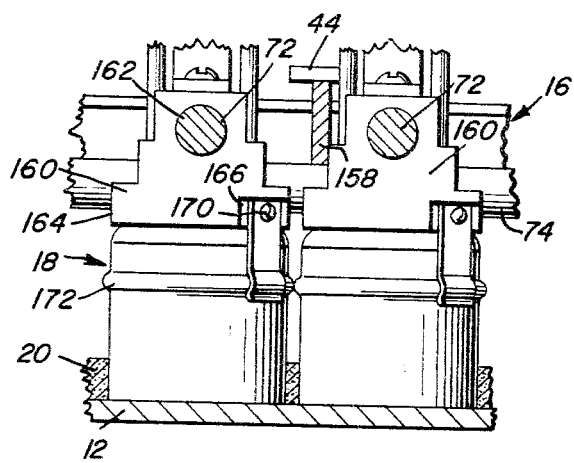
FIGURE 9 is a detail view in vertical transverse section taken upon an enlarged scale substantially upon the plane indicated by the section line 9—9 in FIGURE 5 and showing the cutters upon the completion of their cutting stroke and showing the means for effecting the hammer blow for completing the cutting operation.
Figure 10:
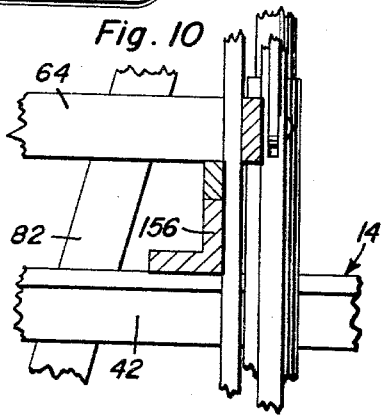
FIGURE 10 is a detail view in vertical transverse section shown upon an enlarged scale the means by which the elevating means lifts the cutter head assembly frame.

As will be observed from a consideration of FIGURES 9 and 10, the carriage angle members 42 carry lift bars 156 which upon their upward travel are engageable upon the undersides of the bars 64 of the cutter head assembly 16 to thus lift the latter upon upward travel of the carriage under the action of its elevating means 26. Upon downward travel of the carriage, further transversely extending thrust members 158, see FIGURE 9, engage upon the support rod 74 to force the cutter head assembly downwardly from the raised position to the first lowered position with the cutters upon the top surface of the sheet of dough, and after the hammer action of the lower cylinder 138, drive the cutter assembly through the sheet of dough and thus sever the doughnut blanks.

Referring now specifically to FIGURE 9 attention is directed to the support and mounting means 160 for each of the cutters 18. This means, see also FIGURES 3, 5, 12 and 16, comprises a generally rectangular block having upper and lower horizontally extending transverse bores 162 and 164 for the upper and lower support rods 72 and 74, respectively. Consequently, the blocks or bodies 160 are slidable longitudinally of each of the two rods as the latter are shifted by the spacing linkages 78, 80. Obviously, as the rods are spread apart the bodies 160 are likewise spaced a greater distance as shown in FIGURE 3 whereas when the rods are moved closer together the bodies are compacted as shown in FIGURE 5.

Each of the bodies has in its outer circumference notched surfaces 166 to which are secured resilient spring clips 168 as by the fasteners 170. Any desired number of these spring clips are provided, which extend down about and engage an annular rib or shoulder 172 formed upon the outer surface of the cutters 18 to releasably retain the latter against the support bodies or blocks 160.

The releasable attachment of the cutters to the support bodies will be more clearly apparent from a consideration of FIGURES 11, 12, 15, 17, 19 and 21. Considering these last-mentioned figures it will be observed that the support body has a central downwardly projecting and downwardly convergent tapering extension 174 which is received within the upper portion of the cutter to position the latter while the cutters are gripped by the retaining spring clips 168.

As shown best in FIGURES 11, 13–15, 17–19 and 21, the cutters 18 comprise generally cylindrical hollow shells 176 having each an integral reentrant portion of a conical downwardly convergent shape comprising a central or inner member 178. The lower ends of the outer shell and the inner member are coplanar and define a central circular inner chamber 180 and an outer annular chamber 182 in a concentric relation. The outer chamber serves to sever the sheet of dough and form the doughnut blank 124 as previously mentioned, while the inner chamber 180 severs the dough and cuts out the center of the doughnut from the doughnut blank to provide the doughnut center 184.

Secured in the center chamber 180 is a fixed perforated partition or horizontal wall 186, having apertures 188 therein and which serves as a limit to prevent further upward travel of the doughnut center 184 into this chamber. The outer chamber 182 has an annular guide ring 190 detachably secured therein as by fastening screws 192, this ring having guide bores or apertures 194 therein. Slidably received below the guide ring 190 in the outer chamber is an annular ring 196 comprising a doughnut ejecting ring. This outer ring is fixedly secured in any suitable manner to a plurality of ejector rods 198 each slidably guided in the guide bores 194 of the guide ring 190 and extending upwardly through an opening 200 in the top of the cutter shell 176 and into a corresponding vertical bore 202 in the mounting body 160. A compression spring 204 surrounds each of the ejector rods 198 and bearing against the guide ring 190 and a collar 206 upon the ejector rod yieldingly urges the latter and the ejector ring 196 into their upper positions.

Fluid pressure operated means are provided for positively driving the ejector rods 198 downwardly and thus causing the ejector rings to expel the doughnut blanks 124 from the outer chamber 182 of the cutter. For this purpose there is provided for each of the cutters a cylinder 208 having a piston 210 therein and spring urged to its upper position by a spring 212 which surrounds the piston rod 214. Secured to the lower end of the piston rod as by a fastener 216 is a plate or bar 218 having bores 220 therethrough and in which are received the upper ends of actuator rods 222, the latter being adjustably but fixedly retained in the bores in any suitable manner, as by the screw threaded engagement shown. The lower ends of the rods 222 are received in the bores 202 and are adapted to abut and strike the upper ends of the ejector rods 198 and thus urge the latter downwardly upon actuation of the piston 210. The cylinder 208 is mounted as by a U-shaped bracket 224 upon the top of the body 160. A fluid pressure conduit 226 establishes communication from a source of fluid pressure to each of the cylinders of each of the cutter units 18.

Figure 16:
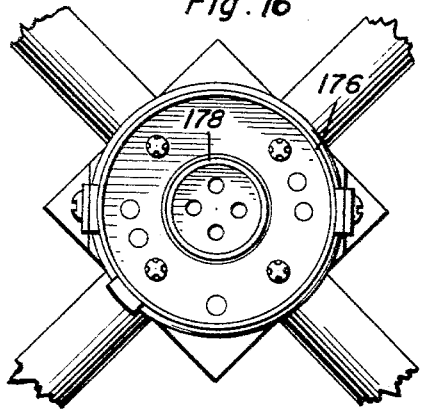
FIGURE 16 is a bottom plan view of one of the cutters.
Figure 18:
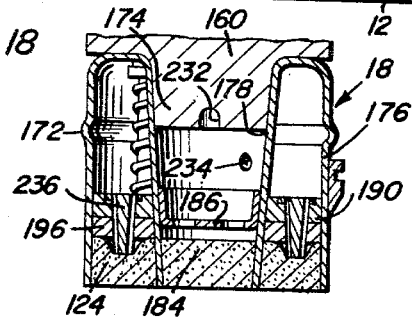
FIGURE 18 is a detail view in vertical cross-section taken substantially upon the plane indicated by the section line 18—18 of FIGURE 20 and upon an enlarged scale and showing the vacuum passages in the cutter structure but showing the cutter rotated circumferentially from the position of FIGURE 17.

Suction means are provided for retaining and holding the doughnut and its center in the cutter after the latter has severed the sheet of dough in order to retain the cut portions 124 and 184 of the dough in the cutter. This suction means consists of a suction supply conduit 228 which communicates with the bore 230 extending through the body 160 and having a port 232 opening into the top of the inner chamber 180. Thus, suction is supplied to the inner chamber to retain the doughnut center therein. From the inner chamber, a passage 234 opens through the wall of the inner member 178 and connects the inner chamber 180 to the outer chamber 182. Referring now to FIGURES 16 and 18 it will be observed that the guide ring 190 has grooved pins 236 depending therefrom and projecting through corresponding openings in the ejector ring 196 for the purpose of applying suction or pressure from the outer chamber above the guide ring 190 to the outer chamber below the ejector ring and upon the top surface of the doughnut blank 124. This serves to prevent sticking of the doughnut blank in the outer shell and to facilitate removal of the doughnut blank without damage thereto when the blank is to be discharged upon the baking pan or tray 122.

Figure 19:
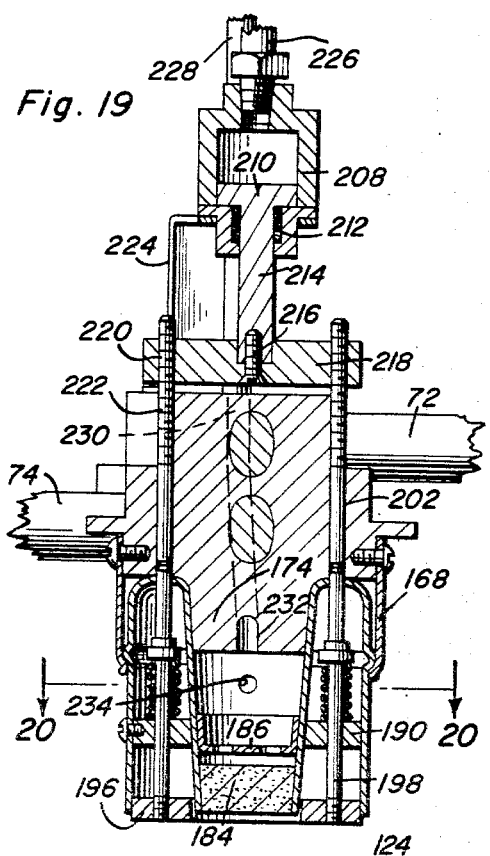
FIGURE 19 is a view similar to FIGURE 11 but showing the cutter in the raised position after the doughnut has been ejected from the cutter upon a frying tray but still retaining the doughnut center in the cutter, this position following in sequence the position of FIGURE 17.
Figure 21:
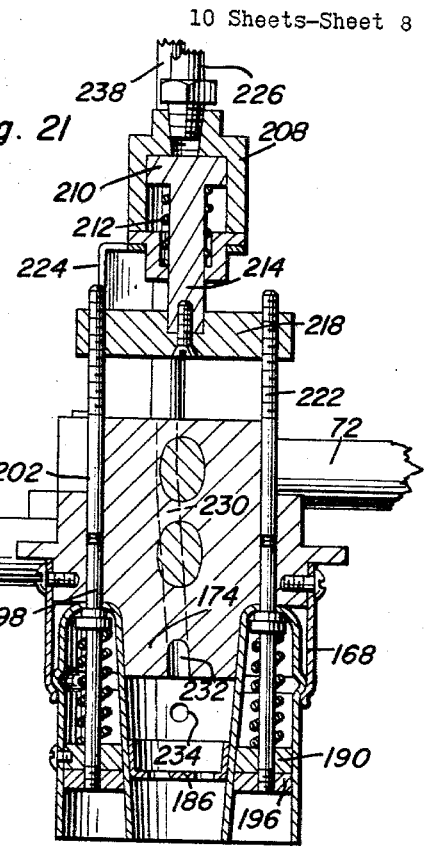
FIGURE 21 is a view similar to FIGURE 11 and showing the cutter in the raised position after both the doughnut and the center have been ejected therefrom; this position sequentially following that of FIGURE 19.
Figure 20:
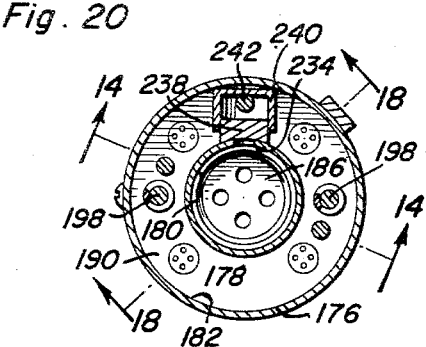
FIGURE 20 is a horizontal sectional view taken substantially upon the plane indicated by the section line 20—20 of FIGURE 19 and showing in particular the magnetic suction passage valve of the cutter.
Figures 22, 23:
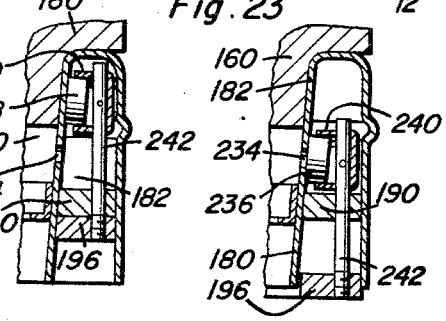
FIGURE 22 is a detail view in vertical section showing more clearly the magnetic valve for closing the suction hole or port into the center die of the cutter and with the valve being in raised position for uncovering the suction port.
FIGURE 23 is a view similar to FIGURE 22 but showing the valve in its lowered port-closing position.

Referring now to FIGURES 20, 22 and 23 it will be observed that the passage or port 232 extending between the inner chamber 180 and the outer chamber 182 is controlled by a magnetic disk 238 comprising a slide valve. It will be observed that the valve 236 is freely received in a recess or socket in a cup 240 which is secured to a support member or pin 242 extending through the guide ring 190 and engaged in the ejector ring 196 for movement therewith. Thus, when the ejector ring is in the upper position as shown in FIGURES 21 and 22, the port 232 is open and therefore the suction supplied by the conduit 228 is available both to the inner and outer chambers, being communicated by the grooved pins 236 of the latter to the top surface of the doughnut blank therein. However, when the ejector is operated to its lower ejecting position as shown in FIGURE 19 and the doughnut blank 124 is being ejected from the outer chamber, the magnetic valve member 236 then moves downwardly with the ejector and closes the port 232 thus cutting off the source of suction from the inner chamber to the outer chamber thereby preventing escape of suction. At this time, the suction which is still maintained in the inner chamber thus retains the doughnut center 184 within the cutter as shown in FIGURE 19.

When it is desired to eject the doughnut centers 184 from the central chamber of the cutters, means are provided to release the vacuum and also to apply air pressure to thereby expel these centers from the central chamber of the cutters. The valve assembly 24 is provided for this purpose. This assembly includes a plurality of venting valves, each indicated by the numeral 244. Conduits 246 connect each valve with the suction bore 230 of the cutter body 160, each valve being vented to the atmosphere as by a duct 248. For convenience, the valve assembly includes a channel member 250 secured to the frame members 58 and having its channel opening at the side to receive the individual vent valve bodies 244 therein in a side-by-side relation. Each valve has a pivoted actuating lever 252 which when depressed against the valve body will open the valve to the atmosphere and thus vent the conduit 246 and the associated suction line of the associated cutter. Means are provided for quickly actuating each of the valves. For this purpose, there is provided a horizontally extending support rod 254 upon which is slidably mounted an actuator body 256 having a handle 258. This body carries an actuating roller 260 which is adapted to depress the valve lever 252 as it passes over the latter. Thus, in a single movement, as will be apparent from a consideration of FIGURES 1 and 3, the valve actuator may be rapidly moved along the length of the housing 250 and in succession will actuate each of the vent valves thus venting each of the cutters to the atmosphere. Obviously, the actuating means 258 may be designed to vent any selected one of the valves and thus disconnect the suction line from any selected cutter.

As set forth hereinafter, the suction supply to the cutters may be replaced by a pressure supply in order to forcibly eject the doughnut center therefrom, the same suction conduit being employed for this purpose.

The various mechanisms and components of this doughnut cutting machine are supplied by power in the form of a fluid medium under a pressure or suction. Referring now to FIGURE 28, it will be observed that there is provided at any suitable location relative to the apparatus a fluid pressure tank 262 and a vacuum tank 264. Suitable power driven pumps, not shown, maintain a pressure supply in the pressure tank 262 and maintain a subatmospheric pressure within the vacuum tank 264 in any suitable manner. These two tanks constitute a source of power for operating the various instrumentalities of the invention in a manner to be now described.

Figure 11:
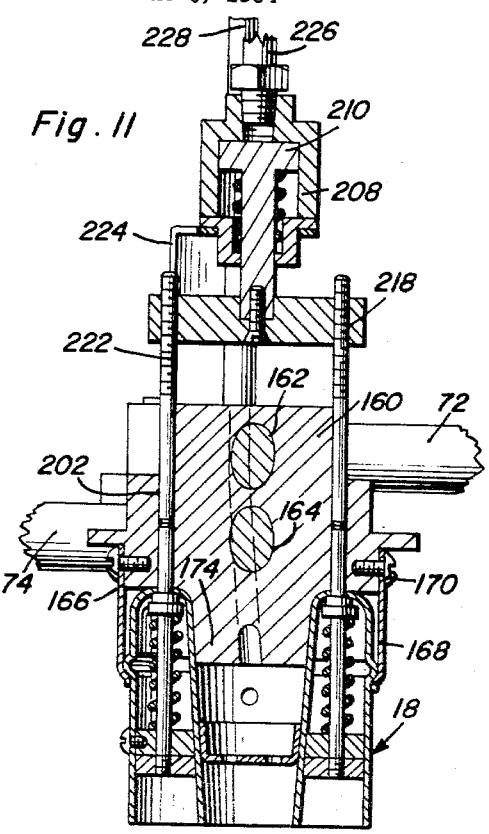
FIGURE 11 is a view in vertical transverse section upon an enlarged scale through one of the doughnut cutters in the raised position of the latter, this being the initial position in the cycle of operation of the cutter.
Figure 13:
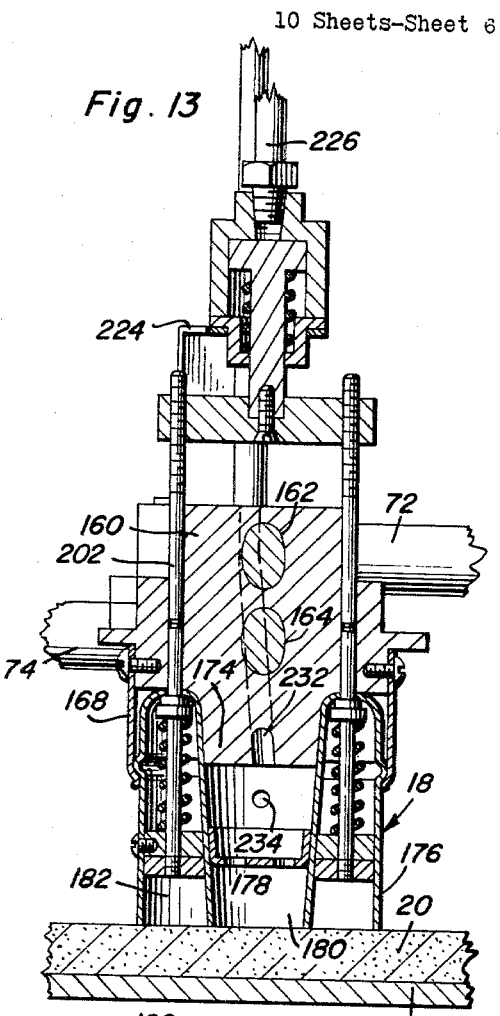
FIGURE 13 is a view similar to FIGURE 11 but showing the doughnut cutter in its first lowered position on top of the sheet of dough in readiness for the cutting stroke of the cutter.
Figure 12:
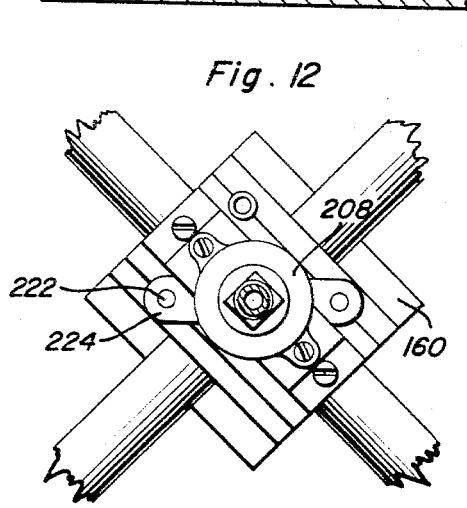
FIGURE 12 is a top plan view of FIGURE 11.
Figure 14:
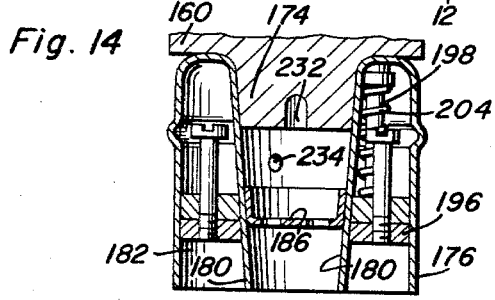
FIGURE 14 is a transverse view in horizontal cross-section taken substantially upon the plane indicated by the section line 14—14 of FIGURE 20 and showing the doughnut ejector in its raised position in the cutter.
Figure 15:
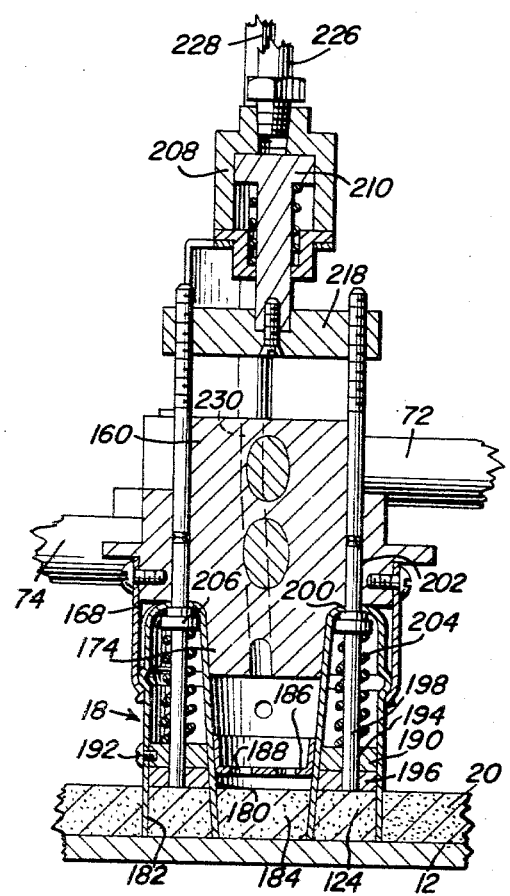
FIGURE 15 is a view similar to FIGURE 11 but showing the position of the cutter in the second or fully lowered position after a hammer blow has been given to the cutter to complete the cutting operation on the sheet of dough.

A pressure line 266 extends through a coupling 268 from which by means of the branch conduits 270 and 272 it supplies pressure fluids for manually operating control valves 274 and 276 respectively. The valve 274 controls the supply of pressure fluid to the respective opposite ends of the upper or first stage fluid pressure operating cylinder 136 of the lift means 26. In a similar manner, the valve 276 controls the supply of fluid at opposite ends of the second stage or lower fluid pressure cylinder 138. The arrangement is such that the lift means may be selectively operated upon its first stage to lift the cutter assembly to its raised position which is the idle position of the device and is shown in FIGURES 1 and 2, and FIGURE 11. This valve is also effective to lift the cutter head assembly to the top of its stroke after a doughnut blank has been cut from the dough sheet, as illustrated in FIGURE 17 and again in FIGURES 19 and 21. The valve 276 is employed, after the upper cylinder 136 has lowered the cutter assembly down upon the top of the doughnut sheet as shown in FIGURES 4 and 13, to actuate the lower cylinder 138 and impart a sudden additional downward movement to the lift mechanism to effect a sharp hammerlike further downward stroke of the cutter head assembly and thus sever the dough sheet and effect cutting of the dough as shown in FIGURE 15.

The vacuum tank 264 is placed in communication by means of the manually operated vacuum control valve 278 and the vacuum supply conduit 280 with the individual suction lines 226 of the cutters 18 to apply suction to the inner and outer chambers thereof in the manner previously described. Upon operation of the venting valve 244, suction line to the associated cutter 18 is vented to the atmosphere or to a pressure manifold 282 connected to the pressure line thereby relieving the vacuum in the cutter and allowing the doughnut blanks therein to be released. In order to facilitate ejection of the doughnut blanks therein, the pressure control valve 284 will supply air pressure to the manifold 282 and by a conduit 286 with the non-return check valve 288 will deliver air to the suction supply conduits 228 of the individual associated cutters 18 thereby operating the ejector cylinders 208 and the ejector ring 198 to effect ejection of the doughnut blank 124 therefrom.

It will thus be apparent that a pressure supply system and a suction supply system are appropriately connected to the cutters to facilitate their operation.

The operation of the device is as follows:

With the tanks 262 and 264 at the desired pressure therein, and with the cutter head assembly and the carriage in their raised position, a sheet of dough is moved upon the work platform beneath the cutter assembly. The valve 274 is now operated causing the cutter assembly to be lowered upon the top of the dough. It has been found that in order to cut a large number of doughnuts simultaneously from a sheet of dough, with a steady pressure, a very great force is required imposing a severe strain upon the driving mechanism of the cutter head assembly. However, with the cutters resting upon the top of the dough, a relatively low pressure will apply a sudden sharp or hammer blow to the assembly which is effective to obtain a clean severing of the dough by the multiple cutters. In accordance with this invention, the lower cylinder unit 138 of the lifting means by means of the valve 276 is now manually energized to apply the sudden hammer blow to the cutter head assembly, this being effected by the downward striking of the support bars 74 of the cutter head assembly by the carriage thrust member or members 158 as illustrated in FIGURE 9. This sudden blow obtained by the second successive downward movement of the carriage is effective to cause the cutters to penetrate the dough. During this penetration, the outer shell cuts the doughnut blank 124 while the inner shell cuts the doughnut center 184 at the same time. The suction valve 278 is now energized supplying suction to the inner and outer chambers of the cutter by means of the suction passage 230 in each of the cutter support bodies 160. Thus, the doughnut blank and the doughnut center are held in position in the cutter by the suction applied thereto. At this time, it should be noted that the magnetic valve 238 is in a raised position of FIGURE 22 thus allowing the suction to be communicated to both the inner and outer chambers.

Figure 17:
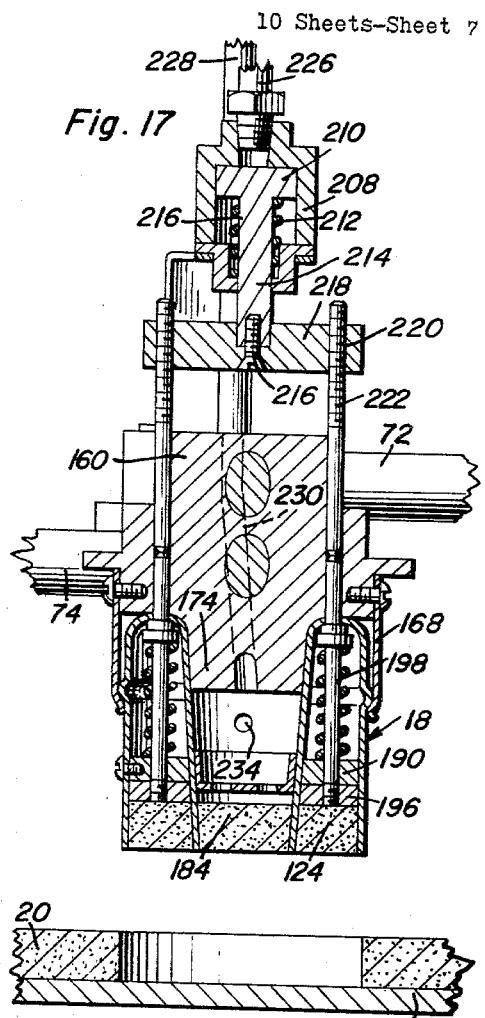
FIGURE 17 is a view similar to FIGURE 11 but showing the doughnut cutter in the raised position and with the doughnut retained therein, the position of FIGURE 17 being a successive position in the operation of the device from the position of FIGURE 15.

The valves 274 and 276 are now reversed, or if desired the valve 274 may be alone reversed, thus causing the lifting means to lift the carriage and the cutter head assembly carrying the still retained doughnut blank and doughnut center therein to the raised position of the device, this being the position shown in FIGURE 17. Now the sheet of dough is removed and the frying or baking pan or tray 122 is placed below the cutter head assembly. The valve 284 is now operated causing air pressure to be applied to the ejector cylinders 208 whereby the piston 210 moving downwardly drives the ejector operating rod 222 to strike the ejector rods 198 and drive the ejector ring downwardly expelling the doughnut blank which now drops upon the pan.

Just prior to this action, it is to be appreciated that the cutter spreading means has been operated by manually manipulating the handle 126 and through the associated linkage effects the desired increased spacing of the doughnuts so that when they are dropped upon the tray 122 they will be in the proper spaced position for the frying operation.

After the doughnuts have been dropped in spaced relation upon the tray, the latter is removed and the doughnuts are processed in any desired manner. Thereafter, the valve assembly 24 is energized by means of the valve actuator body 256 whereby the suction lines are vented and if desired air pressure is applied to the suction lines in the suction bores 230 in the cutter mounting bodies 160 to forcibly expel thereby the doughnut centers. It will be observed that as the ejector ring is operated to expel the doughnut blank, it also as shown in FIGURES 22 and 23 moves the magnetic valve member 238 downwardly to close the port 230 and thus stop communication between the outer doughnut blank receiving chamber and the inner doughnut center holding chamber. Consequently, suction at that time remains applied to a doughnut center holder in the blank during ejection of and subsequent to ejection of the doughnut blank from the cutter. Thereafter, after the frying tray with the properly spaced doughnut blanks thereon have been removed, the doughnut centers are expelled as just described.

An important feature of this invention is that by the individual suction pressure lines to each of the cutters, the device may be utilized to release or discharge the doughnuts of one or more of the cutters or all of them simultaneously. Moreover, the failure of one of the cutter chambers to retain its doughnut blank therein or its doughnut center therein will not interfere with the operation of the suction means of the rest of the system.

A further very important feature of this invention is the removability of the cutters individually or as a complete assembly from the cutter head assembly when it is desired to service the cutters, replace them or change them for a set of cutters having different configurations or size. For this purpose, the power operating means of the device is utilized to advantage and a cutter changing board is also employed.

Referring now to FIGURES 24–26, it will be noted that the cutter changing board is designated by the numeral 285 and comprises a flat board having at the opposite ends thereof handholds 287 to facilitate its maneuvering. The board is provided with a plurality of openings 290 therethrough which as shown in FIGURE 27 are appropriately contoured to receive each one of the cutters 18 therein. The board is provided upon its underside with angle members 292 by which the board is supported above the work platform 12 a slight distance for a purpose to be subsequently set forth. The previously mentioned openings 290 are each provided with an outwardly extending slot 294 so disposed that the cutter 18 may be disposed through the bore 290 with a radially projecting locking lug 296 being received in the notch or slot 294 with the bottom edge of the cutter being supported upon the work platform 12. The openings or bores 290 are spaced to receive the cutters when the latter are in their extended position.

Secured to the underside of the board is a locking means whereby each of the cutters may be simultaneously locked to the changing board 285 or released therefrom. This locking means comprises a pair of slide actuator bars 298, each slidable through guide brackets 300 secured to the bottom side of the board. Extending transversely of and secured to the slide bars or operator bars 298 are transverse locking strips 302, each disposed adjacent and across the slots 294 of the bores 290. The arrangement is such that when the bars 298 are moved longitudinally, they will cause movement of the associated locking strips 302 to cause them to enter into locking recesses or notches 304 provided in the locking lugs 296 as shown in FIGURE 27.

Sliding movement of the set of locking strips is effected by providing a pair of actuator bars 298 with rack teeth 306 at one end thereof. The rack teeth are engaged by pinions 308 upon an operating shaft 310 journaled in suitable bearing brackets 312 on the underside of the board and having a handle 314. By manipulating the handle, it is evident that the shaft 310 through the engagement of the teeth 308 with the rack teeth 306 will effect sliding movement of the locking strips 302 into or out of their locking engagement.

The arrangement is such that with the cutter assembly in its raised position, the locking board will be placed and oriented on the work table or platform 12 therebeneath. Upon lowering the cutter assembly, each of the cutters will enter into one of the bores 290 whereupon by operation of the handle 314 the locking strips 302 will be caused to engage lockingly into the locking recesses 304 of the cutter lugs 296. With the parts thus assembled, it is merely necessary to cause the lift means to raise the cutter assembly, whereupon the entire set of cutters will be withdrawn from the spring clips 168.

In this manner, it is apparent that the power operated elevating means may be employed to simultaneously remove the entire set of cutters from the cutter head assembly when it is desired to inspect or service the cutters, or replace a damaged cutter, or to interchange the set of cutters with a new set of cutters having different characteristics, shapes, contours and the like. It is evident that by providing properly oriented stops on the work platform 12, the cutter changing board 285 will be readily positioned and precisely oriented with respect to the cutter head assembly so that when the latter is lowered each of the cutters will fit precisely into its corresponding bore 290. With a single operation, the cutter locking strips 302 will be caused to engage all of the cutters and by again operating the power lift, the assembly of cutters will be completely stripped from the apparatus.

In a similar manner, the cutter removing board may be provided with a new set of cutters so that when the set of cutters in use with the machine are removed as described the board containing them can be readily removed, the new board with the new set of cutters may be readily installed in place thereof, and by again lowering the cutter head assembly, the new set of cutters may be picked up and secured in proper position upon the cutter head assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A doughnut cutting machine comprising a base, a carriage guidingly and slidingly mounted upon said base for vertical movement thereon, elevating means for lifting and lowering said carriage relative to said base, a cutter head assembly mounted upon said base for vertical movement relative thereto, a plurality of cutters mounted upon said cutter head assembly and movable in two directions in a horizontal plane whereby to adjustably vary the spacing of said cutters from a minimum closely spaced relation to a maximum widely spaced relation, operating means for varying the spacing between said cutters and means for expelling cut dough from said cutters.

2. The combination of claim 1 wherein said elevating means includes actuating mechanism effecting the lowering of said cutter head assembly in a first step into contact with a sheet of dough and in a second step with a sudden hammer blow severing said sheet of dough.

3. The combination of claim 1 wherein said cutter head assembly is freely vertically slidable upon support rods rising from said base, said carriage having members engageable with said cutter head assembly for lifting and lowering the latter.

4. The combination of claim 3 wherein said cutter head assembly includes two vertically spaced and perpendicular sets of parallel horizontal support rods, each cutter being slidably mounted upon a pair of support rods, one in each set, the rods in each set being mounted for movement toward and from each other, said operating means being connected to all of said support rods.

5. The combination of claim 4 wherein said operating means comprises a plurality of linkages connected to said support rods and a manual control connected to all of said linkages.

6. The combination of claim 1 wherein each cutter comprises an inverted cup-shaped body having concentric outer and inner chambers for respectively cutting doughnut blanks from a sheet of dough and cutting doughnut centers from said blanks, and fluid suction means applying suction to both said chambers whereby said cutters will retain and remove cut dough from a dough sheet.

7. The combination of claim 6 wherein said fluid suction means is applied directly to said inner chamber, and passage means communicating the suction from said inner chamber to said outer chamber.

8. The combination of claim 7 including a valve controlling communication through said passage means.

9. The combination of claim 8 wherein said valve is a magnetic member slidable upon the wall of said inner chamber, a doughnut blank ejector ring in said outer chamber, means operating said ejector ring and means connecting said ejector ring to said valve.

10. The combination of claim 9 wherein said ejector ring operating means comprises a fluid pressure cylinder and piston unit connected to said ejector ring.

11. The combination of claim 10 including a guide ring secured in said outer chamber disposed above said ejector ring.

12. The combination of claim 1 wherein each cutter comprises an inverted cup-shaped body having concentric outer and inner chambers for respectively cutting doughnut blanks from a sheet of dough and cutting doughnut centers from said blanks, and fluid suction means applying suction to both said chambers whereby said cutters will retain and remove cut dough from a dough sheet, means for venting the suction from each of said cutters.

13. The combination of claim 12 wherein said venting means comprises a venting conduit for each cutter and a venting valve in each venting conduit, said venting valves being disposed in side-by-side relation, a common actuator movable along successively actuating said venting means.

14. The combination of claim 1 including a releasable connection between each cutter and said cutter head assembly, a cutter changing board, means for removably supporting said board upon said base in oriented relation below said cutter head assembly, means on said board for retaining a cutter thereon whereby movement of said cutter head assembly will remove or replace all of said cutters simultaneously.

15. The combination of claim 14 wherein said board retaining means comprises apertures each receiving a cutter therein, latch bars on said board movable into latching engagement with said cutters.

16. The combination of claim 15 wherein each cutter has a laterally projecting locking lug with a latching recess therein receiving said latch bar, said bowed apertures each having a recess in the periphery thereof for receiving said cutter lug.

17. A doughnut machine for cutting dough on a surface comprising a plurality of cutters arranged in spaced relation in rows and with said rows arranged in spaced side-by-side relationship, edges on said cutters facing the surfaces, first means supporting said cutters for movement to and from the surface for cutting the dough, spacing means connected to said cutters for simultaneously moving them together in both longitudinal and transverse directions in a cutting position and simultaneously moving them apart in a spaced position, retaining means in said cutters for causing the cut dough therein to be lifted with the cutters.

18. A doughnut machine for cutting dough on a surface comprising a plurality of cutters arranged in spaced relation in rows and with said rows arranged in spaced side-by-side relationship, edges on said cutters facing the surface, first means supporting said cutters for movement to and from the surface for cutting the dough, spacing means connected to said cutters for simultaneously moving them together in both longitudinal and transverse directions in a cutting position and simultaneously moving them apart in a spaced position, retaining means in said cutters for causing the cut dough therein to be lifted with the cutters, said surface being plane, said edges in all operative positions lying in a plane substantially parallel to said surface.

19. A device as defined in claim 17 wherein each of said edges is circular in shape.

20. A device as defined in claim 17 wherein each of said edges is rectangular in shape.

21. A doughnut machine for cutting dough on a surface comprising a plurality of cutters arranged in spaced relation in rows and with said rows arranged in spaced side-by-side relationship, edges on said cutters facing the surface, first means supporting said cutters for movement to and from the surface for cutting the dough, spacing means connected to said cutters for simultaneously moving them together in both longitudinal and transverse directions in a cutting position and simultaneously moving them apart in a spaced position, retaining means in said cutters for causing the cut dough therein to be lifted with the cutters, said cutters each having an opening enclosed by one of said edges, the remainder of said cutters being closed, said retaining means comprising a vacuum line connected to the interior of each of said cutters.

22. A doughnut machine for cutting dough on a surface comprising a plurality of cutters arranged in spaced relation in rows and with said rows arranged in spaced side-by-side relationship, edges on said cutters facing the surface, first means supporting said cutters for movement to and from the surface for cutting the dough, spacing means connected to said cutters for simultaneously moving them apart in both longitudinal and transverse directions in a spaced position, retaining means in said cutters for causing the cut dough therein to be lifted with the cutters, said cutters each having an opening enclosed by one of said edges, the remainder of said cutters being closed, said retaining means comprising a vacuum line connected to the interior of each of said cutters, the vacuum line from each cutter being connected to a vacuum manifold, a remotely controlled vacuum supply line connected to said manifold.

23. A doughnut machine for cutting dough on a surface comprising a plurality of cutters arranged in spaced relation in rows and with said rows arranged in spaced side-by-side relationship, edges on said cutters facing the surface, first means supporting said cutters for movement to and from the surface for cutting the dough, spacing means connected to said cutters for simultaneously moving them together in both longitudinal and transverse directions in a cutting position and simultaneously moving them apart in a spaced position, retaining means in said cutters for causing the cut dough therein to be lifted with the cutters, said surface being plane, said edges in all operative positions lying in a plane substantially parallel to said surface, said cutters each having an opening enclosed by one of said edges, the remainder of said cutters being closed, said retaining means comprising a vacuum line connected to the interior of each of said cutters.

24. A device as defined in claim 17 wherein said retaining means comprises a source of vacuum connected to each of said cutters.

25. A doughnut machine for cutting dough on a surface comprising a plurality of cutters arranged in spaced relation in rows and with said rows arranged in spaced side-by-side relationship, edges on said cutters facing the surface, first means supporting said cutters for movement to and from the surface for cutting the dough, spacing means connected to said cutters for simultaneously moving them together in both longitudinal and transverse directions in a cutting position and simultaneously moving them apart in a spaced position, retaining means in said cutters for causing the cut dough therein to be lifted with the cutters, said spacing means comprising a box-like cutter frame including a rectangular sub-frame fixed to its lower end, a plurality of rows of cutters arranged in said sub-frame, a plurality of parallel cutter support rods slidably supported on said sub-frame, a plurality of parallel operator rods above and normal to said support rods, each of said cutters slidably connected to one of said support rods and one of said operator rods.

26. A device as defined in claim 25 wherein a pivot frame is fixed to said cutter frame above said sub-frame, a plurality of spacer levers pivotally intermediate their ends to said pivot frame, an operator frame slidable on said cutter frame towards and away from said pivot frame, operating means connecting said operating frame and said spacing levers.

27. A device as defined in claim 26 wherein said operating means comprises operator levers pivotally connected at their opposite end to said operator frame and spacer levers.

28. A device as defined in claim 27 wherein said cutter frame is mounted on a movable frame for sliding movement towards and away from said surface when said movable frame is supported on said surface.

29. A device as defined in claim 28 wherein said movable frame is supported for vertical movement in a frame fixed in relation to said surface.

30. A device as defined in claim 29 wherein said movable frame is suspended from fixed frame above said surface by cables having counterweights at their free ends.

31. The combination of claim 17 wherein said spacing means varies the spacing of said cutters in said rows.

32. The combination of claim 17 wherein said spacing means varies the spacing between the adjacent rows of cutters.

33. The combination of claim 17 wherein said spacing means simultaneously varies and in the same sense the spacing of cutters within said rows and the spacing between adjacent rows.

References Cited by the Examiner

UNITED STATES PATENTS

| | | | |
|---|---|---|---|
| 658,617 | 9/1900 | Callow | 107—9 |
| 998,017 | 7/1911 | Lankhuff | 83—167 |
| 2,415,976 | 2/1947 | Thorud | 30—130 |
| 2,487,271 | 10/1949 | Petri | 83—99 |
| 2,585,379 | 2/1952 | Fulmer | 107—69 |
| 2,695,570 | 10/1954 | Helland | 107—8 |
| 2,790,398 | 9/1957 | Orr | 107—69 |
| 2,903,290 | 9/1959 | Morris | 214—1 |
| 2,929,341 | 3/1960 | Zoeller et al. | 107—54 |
| 3,088,354 | 5/1963 | Voorhees | 83—152 |
| 3,101,021 | 8/1963 | Johnson | 83—99 |

WILLIAM W. DYER, Jr., *Primary Examiner.*

LEIGH B. TAYLOR, *Assistant Examiner.*